H. R. BERNDT.
SLED.
APPLICATION FILED OCT. 25, 1920.
1,405,262. Patented Jan. 31, 1922.
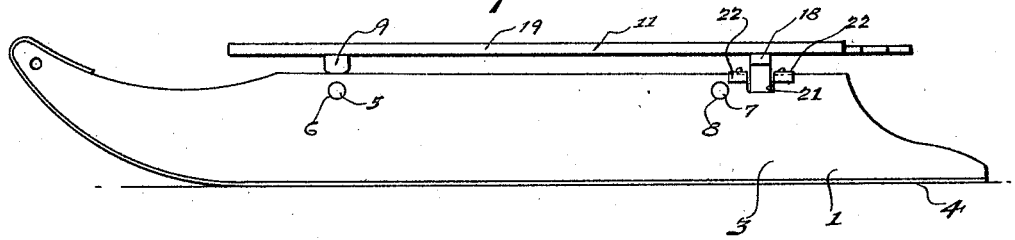
Fig. 1
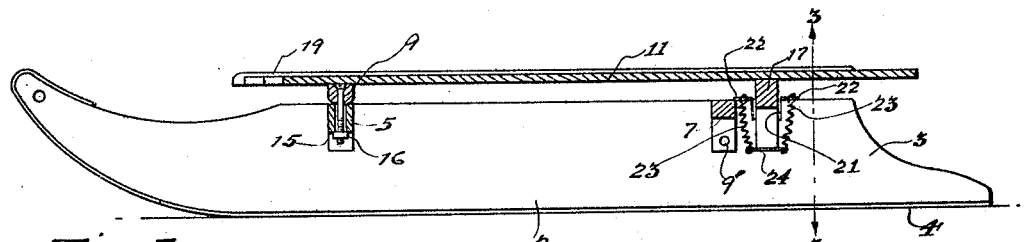
Fig. 2
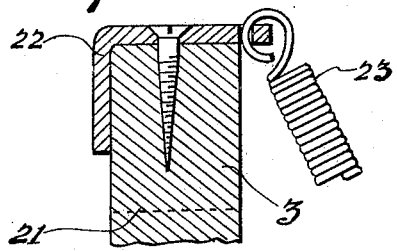
Fig. 5
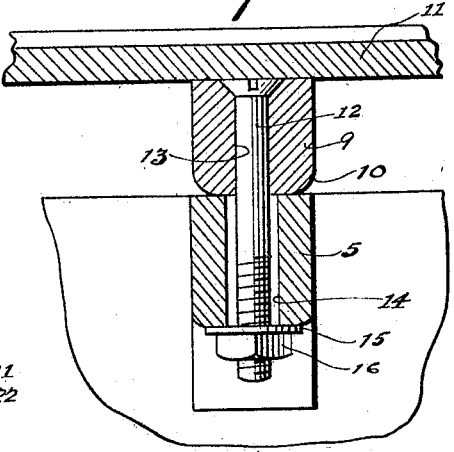
Fig. 4
Fig. 3
H. R. BERNDT
INVENTOR
BY Victor J. Evans
ATTORNEY

UNITED STATES PATENT OFFICE.

HERMAN R. BERNDT, OF CHICAGO, ILLINOIS.

SLED.

1,405,262.   Specification of Letters Patent.   Patented Jan. 31, 1922.

Application filed October 25, 1920. Serial No. 419,240.

*To all whom it may concern:*

Be it known that I, HERMAN R. BERNDT, a citizen of the United States, residing at Chicago, in the county of Cook and State of Illinois, have invented new and useful Improvements in Sleds, of which the following is a specification.

This invention relates to sleds and an object of the invention is to provide a sled in which the top or platform is yieldably connected with the runners, and also to provide shock absorbing means establishing connection between the top or platform and runners whereby shocks incident to the travel of the sled over rough places or caused when the sled is thrown on a hillside for coasting, will be absorbed.

Other objects of the invention will appear in the following detailed description and in the accompanying drawings wherein:

Fig. 1 is a side elevation of the improved sled.

Fig. 2 is a longitudinal section through the sled.

Fig. 3 is a cross section through the sled taken on the line 3—3 of Fig. 2.

Fig. 4 is an enlarged fragmentary section through the sled.

Fig. 5 is a fragmentary detail showing connection of spring.

Referring more particularly to the drawings, 1 and 2 indicate the runners of the sled which comprise the usual wood body portions 3 and metal runners 4 on the surface engaging edges of the runners. The runners 1 and 2 are connected, near their forward ends, by a crossbar 5, the ends of which are rounded and seated in suitable circular openings 6 in the runners 2 and 3. The rear crossbrace or bar 7 also has its ends rounded, and seated in the openings 8 formed in the bodies 3 of the runners 1 and 2. Suitable fastening means, such as screws 9', extend through the braces 5 and 7 for rigidly connecting them to the runners 1 and 2. A crossbar 9 rests upon the upper edge of the crossbrace 5 and it has its lower edge rounded, as shown at 10. The platform or top 11 of the sled is attached to the crossbar 9 in any suitable manner, and the crossbar 9 is connected to the crossbrace 5 by bolts 12, two of which are, preferably, employed. The bolts 12 fit snugly in openings 13 extending through the crossbar 9 and fit loosely in openings 14 formed in the crossbrace 5, as clearly shown in Figs. 2 and 4 of the drawings, to permit limited rocking movement of the crossbrace 9 and of the platform or top 11 relative to the crossbrace 5. Vertical movement of the crossbar 9 relative to the crossbrace 5 is prevented by the washers 15 and nuts 16.

The platform or top 11 is connected, near its rear end, to a supporting block or bar 17 which extends between the runners 1 and 2 having its ends, facing the runners, spaced slightly from the runners, as clearly shown in Fig. 3 of the drawing. The block 17 extends above the upper edges of the runners 1 and 2 and has longitudinally extending projections 18 on the ends of its portion which normally rests above the upper edges of the runners, to accommodate the side rails 19 of the top or platform structure which side rails are slightly thinner than the main slats of the platform or top 11. The under surfaces of the extensions 18 are rounded as shown at 20 and are adapted for moving into cutout portions 21 when the platform moves downwardly towards the runners. Angle plates 22 are carried by the runners 1 and 2 and their inner ends project beyond the inner sides of the runners and are perforated to permit connection therewith of the upper ends of shock absorbing springs 23. The lower ends of the springs 23 are connected to the plates 24 which are attached to the under surface or edge of the block 17 near each end and have their ends projecting beyond the edges of the block and perforated to permit connection thereto of the lower ends of the springs 23. A pair of springs 23 is positioned at each end of the block 17, one upon each side of the block, as clearly shown in Fig. 2 of the drawings, and these springs are hung so that they will incline inwardly towards the sides of the block as they extend downwardly and also incline away from the inner surfaces of the runners 1 and 2, adjacent which they are mounted, as they extend downwardly, thus providing a shock absorbing resilient suspension for the rear end of the platform or top 11, which, owing to the position of the bolts 12 in the enlarged openings 14, will permit a limited pivotal movement of the top or platform 11 relative to the runners 1 and 2 for absorbing shocks incident to the travel of the sled over rough places and consequently cushion the riding of the sled.

The rounding of the under surface of the extensions 18 are provided to prevent pinching or crushing of a child's fingers should they get beneath the outer portions of these extensions.

From the foregoing description taken in connection with the accompanying drawing it will be apparent that an improved sled has been provided wherein the child supporting platform is yieldably mounted for cushioning the travel of the sled and preventing the transmission of shocks to the platform from the runners and also that a sled of this nature has been provided which can be manufactured at a relatively low cost, being simple and economical in construction.

It is, of course, to be understood that the invention may be constructed in various other manners and the parts associated in different relations and, therefore, I do not desire to be limited in any manner except as set forth in the claim hereunto appended.

Having thus described my invention what I claim is:

In a sled, runners, a platform, means connecting said platform adjacent its forward end to said runners to permit limited pivotal movement of the platform relative to the runners, a cross block attached to said platform adjacent its rear end and extending between said runners, springs connected to said runners and to said block for yieldably supporting the rear end of the platform in its normal position, said springs arranged in pairs at each end of said cross block and one upon each side of the cross block.

In testimony whereof I affix my signature.

HERMAN R. BERNDT.